United States Patent
Cooper et al.

(10) Patent No.: US 6,934,662 B2
(45) Date of Patent: Aug. 23, 2005

(54) MEMS BASED TILT SENSOR

(75) Inventors: Peter D. Cooper, Sydney (AU); John S. Wenstrand, Menlo Park, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/741,938

(22) Filed: Dec. 19, 2003

(65) Prior Publication Data

US 2005/0132799 A1    Jun. 23, 2005

(51) Int. Cl.[7] ............................. G01C 9/10; G01P 3/00
(52) U.S. Cl. ....................................... 702/154; 73/509
(58) Field of Search .................... 73/488, 491, 492, 73/495, 503, 504.12, 504.13, 509, 514.35; 702/33, 56, 150, 151, 154; 340/686.1, 689

(56) References Cited

U.S. PATENT DOCUMENTS

| | | | | |
|---|---|---|---|---|
| 4,422,683 A | * | 12/1983 | Charonnat | 294/81.3 |
| 4,450,353 A | * | 5/1984 | Sjolund | 250/231.1 |
| 4,656,458 A | * | 4/1987 | Iwata | 340/669 |
| 4,707,927 A | * | 11/1987 | Hiyama | 33/366.19 |
| 5,025,246 A | * | 6/1991 | Schenkel | 340/572.8 |
| 5,180,986 A | * | 1/1993 | Swartz et al. | 324/660 |
| 5,183,056 A | * | 2/1993 | Dalen et al. | 600/595 |
| 5,847,820 A | * | 12/1998 | Hamar | 356/139.1 |
| 6,140,635 A | * | 10/2000 | Kazumi et al. | 250/231.1 |
| 2002/0166388 A1 | | 11/2002 | Ganapathi et al. | |
| 2003/0055597 A1 | * | 3/2003 | Berndorfer | 702/150 |

FOREIGN PATENT DOCUMENTS

| | | | | |
|---|---|---|---|---|
| DE | 197 23 069 C1 | * | 10/1998 | B60R 25/00 |
| JP | 4-294208 | * | 10/1992 | G01C 9/10 |
| JP | 8-29450 | * | 2/1996 | G01P 15/135 |
| JP | 2003-287421 | * | 10/2003 | G01C 9/10 |

OTHER PUBLICATIONS

"Touch Panel Technology", NEC/Mitsubishi Electronics Display, White Paper, 5 pages.

* cited by examiner

*Primary Examiner*—Evan Pert

(57) ABSTRACT

A sensor system is mounted on a host for recording motion of the host over time. The sensor system includes a sensor pad having a surface with a positive slope away from a center of the surface, and a mass resting on the sensor pad. The sensor pad includes an array of pressure sensors for determining the location of the mass on the sensor pad. The sensor system can further include a memory and a controller coupled to the memory and the sensor pad. The controller can determine the motion of the host from the location of the mass and record the motion in the memory.

26 Claims, 4 Drawing Sheets

MEMS BASED TILT SENSOR

DESCRIPTION OF RELATED ART

MEMS (micro-electromechanical system) is the integration of mechanical elements, sensors, actuators, and electronics on a common silicon substrate through microfabrication technology. While the electronics are fabricated using integrated circuit (IC) process sequences (e.g., CMOS, Bipolar, or BICMOS processes), the micromechanical components are fabricated using compatible "micromachining" processes that selectively etch away parts of the silicon wafer or add new structural layers to form the mechanical and electromechanical devices.

MEMS makes possible the realization of complete systems-on-a-chip. Microelectronic integrated circuits can be thought of as the "brains" of a system and MEMS augments this decision-making capability with "eyes" and "arms" to allow the system to sense and control the environment. As MEMS devices are manufactured using batch fabrication techniques similar to those used for integrated circuits, unprecedented levels of functionality, reliability, and sophistication can be placed on a small silicon chip at a relatively low cost. MEMS sensors have many applications, including shock sensors that rest inside packages to monitor time and any type of damage that may occur while the package is in transit.

SUMMARY

In one embodiment of the invention, a sensor system is mounted on a host for recording motion of the host over time. The sensor system includes a sensor pad having a surface with a positive slope away from a center of the surface, and a mass resting on the sensor pad. The sensor pad can include an array of pressure sensors for determining the location of the mass on the sensor pad. The sensor system can further include a memory and a controller coupled to the memory and the sensor pad. The controller can determine the motion of the host from the location of the mass and record the motion in the memory.

BRIEF DESCRIPTION OF THE DRAWINGS

Use of the same reference numbers in different figures indicates similar or identical elements.

DETAILED DESCRIPTION

Figure 1:
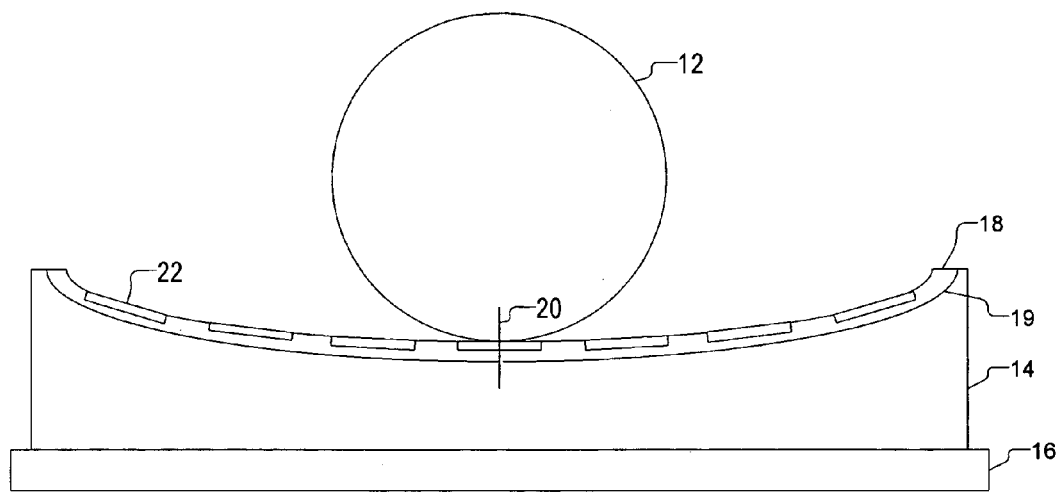
FIGS. 1 and 2 are side and top views of a mass and a sensor pad with an array of pressure sensors for determining the motion of a host in one embodiment of the invention.
Figure 2:
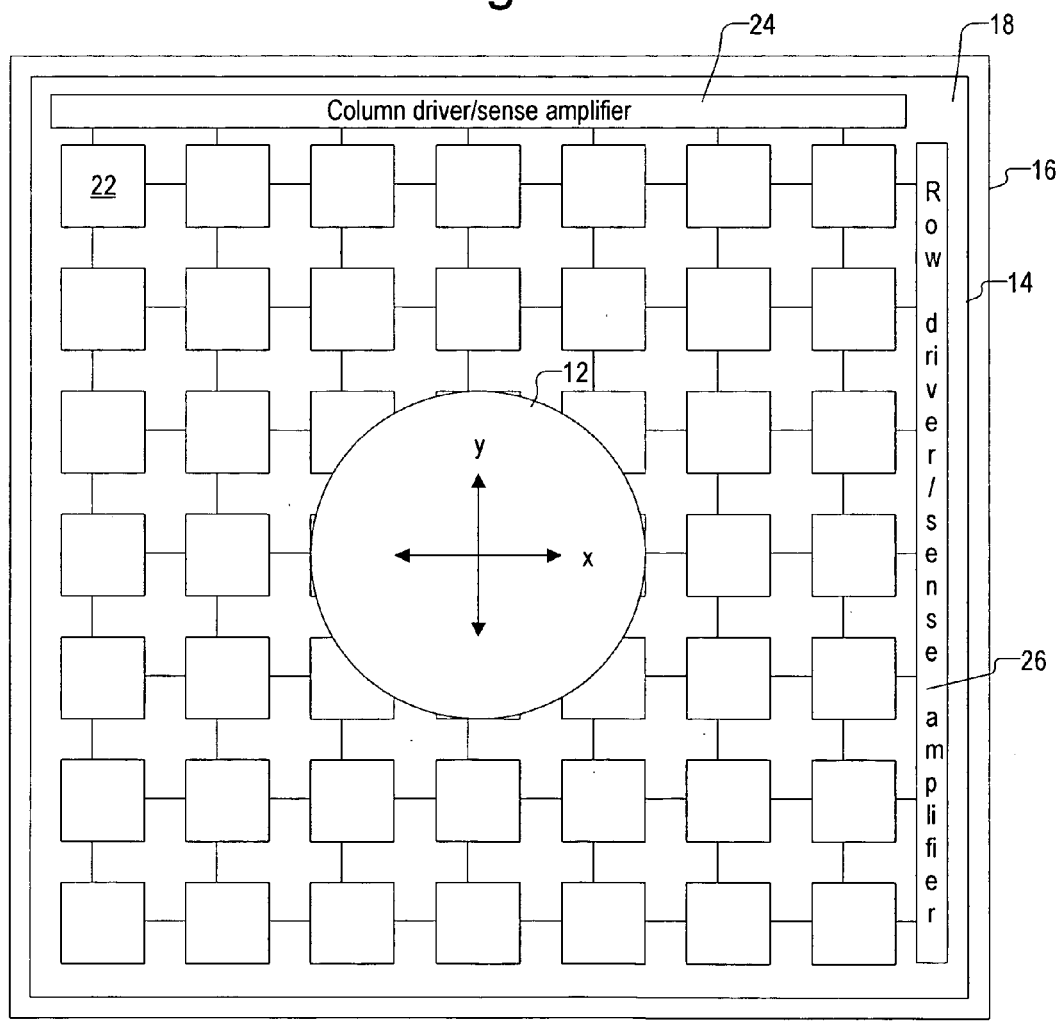

FIGS. 1 and 2 are side and top views of a mass 12 and a sensor pad 14 for determining the motion of a host 16 over time in one embodiment of the invention. In one embodiment, mass 12 is a ball. Ball 12 rests on a film 18 (e.g., a polyimide film) atop a surface 19 of sensor pad 14. Surface 19 has a positive slope away from the center 20 of sensor pad 14 so that ball 12 returns to the center 20 of film 18 when host 16 is level. When host 16 tilts or experiences lateral motion, ball 12 would travel away from the center 20 of film 18. One advantage of this setup is that the momentum of ball 12 ensures that even a sharp impulse of acceleration will be detected, as the relative motion of ball 12 will continue after the impulse has passed. Surface 19 can be a parabolic or spherical surface.

In one embodiment, film 18 includes a rectangular array of pressure sensors 22. Alternatively, sensor film 18 can include a circular array of pressure sensors 22. For clarity, only one pressure sensor 22 is labeled. Ball 12 can rest on one or more pressure sensors 22 at any moment in time. In one embodiment, pressure sensors 22 are MEMS (micro-electromechanical system) pressure sensors that are made using conventional integrated circuit technology on a flexible substrate that can conform to surface 19. MEMS pressure sensors can be micro switches that short/open under pressure or piezoelectric elements that create charge when under pressure.

Each pressure sensor 22 is coupled to a column address line and a row address line to indicate the x and y location of ball 12 on sensor film 18. Various addressing schemes can be implemented to determine the location of ball 12 on sensor film 18. In one embodiment, ball 12 acts to short a connection between the column and the row address lines in pressure sensor 22 so the presence of current indicates the location of ball 12. In another embodiment, ball 12 acts to create a charge so the presence of voltage between specific column and row address lines indicates the location of ball 12. The column and row address lines are coupled to a column driver or sense amplifier 24 and a row driver or sense amplifier 26, depending on the implementation of the addressing scheme.

Figure 3:
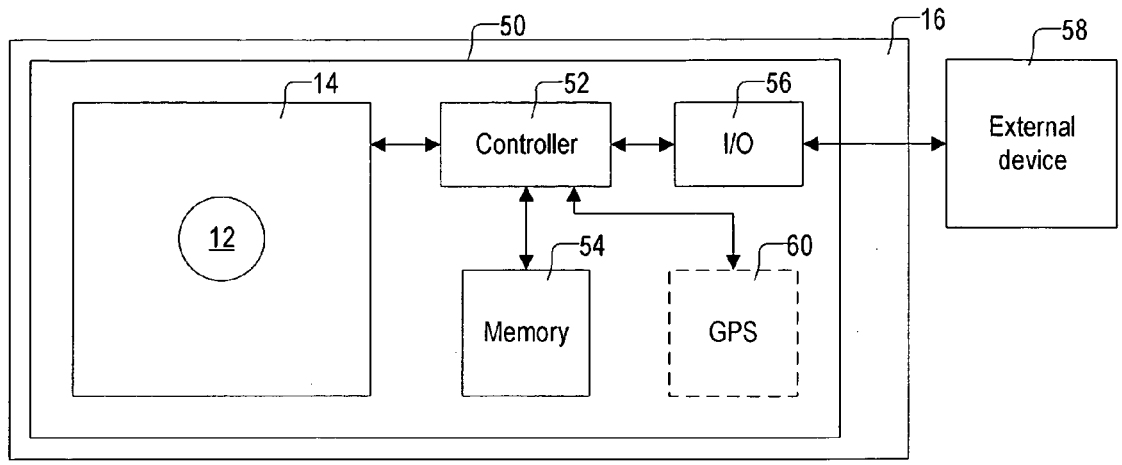
FIG. 3 is a block diagram of a sensor system with the mass and the sensor pad of FIGS. 1 and 2 in one embodiment of the invention.

FIG. 3 is a block diagram of a sensor system 50 mounted on host 16 in one embodiment of the invention. Sensor system 50 can be used to monitor the lateral acceleration (through tilt and due to gravity, or through lateral motion) that host 16 experiences while in transit. In conjunction with shipping documents, a user can determine custody at the time of unwanted acceleration.

Sensor system 50 includes ball 12 and sensor pad 14 described above. Sensor system 50 further includes a controller 52, a memory 54, and an I/O (input/output) block 56. In one embodiment, sensor system 50 optionally includes a GPS (global positioning system) unit 60. Although shown as individual blocks, all the components can be made in a single chip.

Controller 52 is coupled to sensor pad 14 to sample the location of ball 12 over time (e.g., several times each second). In one embodiment, controller 52 saves the location of ball 12 over time in memory 54. The time recorded can be the absolute time or relative time from the activation of sensor system 50. In addition or alternative to saving the location of ball 12 over time, controller 52 can use I/O block 56 to transmit the location of ball 12 to an external device 58, such as a computer. I/O block 56 can communicate the location of ball 12 either through a physical connection such as a serial port or through a wireless connection such as Bluetooth or infrared. Controller 52 is optionally coupled to GPS unit 60 to receive the current position of host 16 and the absolute time, which can be recorded along with the location of ball 12 over time in memory 54 and/or transmitted to external device 58. Alternatively, controller 52 can use I/O block 56 to communicate with an external GPS unit to receive the current position of host 16 and the absolute time.

In another embodiment, controller 52 converts the location of ball 12 to motion information about host 16, such as the tilt angle of host 16. Controller 52 saves the motion information over time in memory 54. In addition or alternative to saving the motion information over time, controller 52 can use I/O block 56 to transmit the motion information to external device 58.

In one embodiment, sensor system 50 is powered by a battery and can be activated by a switch. Once activated, sensor system 50 records the information about host 16 over a first predetermined time. After the first predetermined time, sensor system 50 retains the saved information for a second predetermined time until the system loses its battery power.

Figure 4:
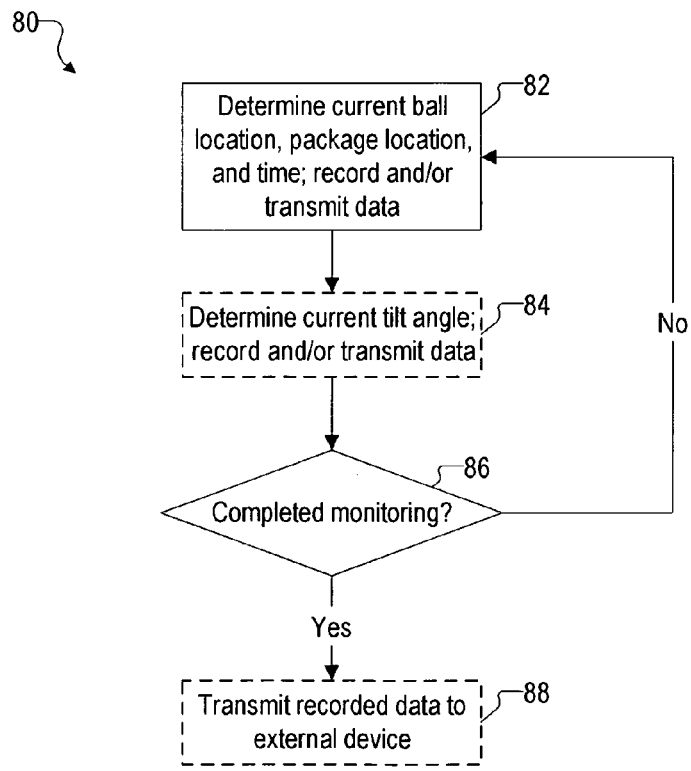
FIG. 4 is a flowchart of a method to use the sensor system of FIG. 3 in one embodiment of the invention.

FIG. 4 is a flowchart of a method 80 for sensor system 50 to determine the motion information of host 16 in one embodiment of the invention.

In step 82, controller 52 determines the current x and y coordinates of ball 12 and the relative time. Optionally, controller 52 also determines the current host location and the absolute time. Controller 52 can record the current ball coordinates, the host location, and the time in memory 54. In addition or alternative to recording these data, controller 52 can transmit them to external device 58 in real time.

In an optional step 84, controller 52 approximates the current tilt angle of host 16 from the x and y coordinates of ball 12. The current tilt angle is approximated the location of ball 12 can be due to (1) tilt of host 16 and caused by gravity, (2) lateral motion of host 16, or (3) a combination thereof. Controller 52 can record the current tilt angle, along with the other data described above, in memory 54. In addition or alternative to recording these data, controller 52 can transmit them to external device 58 in real time.

Controller 52 can approximate the tilt angle using the trigonometry relationship between the physical positions of pressure sensors 22. The distance between the pressure sensor located at the center 20 of sensor film 18 and another pressure sensor are used to calculate the tilt angle of host 16.

Figure 5:
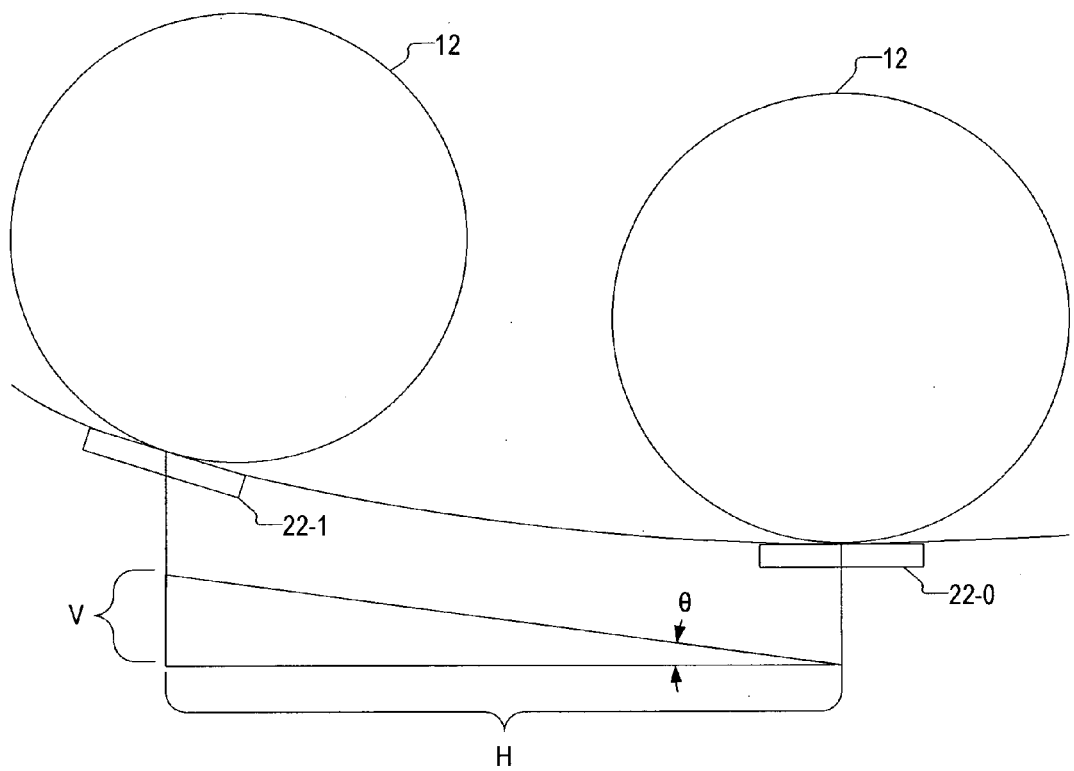
FIG. 5 illustrates how the method of FIG. 4 determines the motion of the host in one embodiment of the invention.

In one example shown in FIG. 5, ball 12 travels from center sensor 22-0 to sensor 22-1 when host 16 tilts. Thus, tilt angle θ of host 16 is simply the arctangent of V/H, where V is the vertical distance between the two sensors and H is the horizontal distance between the two sensors.

In one embodiment where surface 19 has a spherical shape, the tilt angle can be calculated as follows:

$$\theta = s/R, \quad (1)$$

where θ is the tilt angle, s is the arc length from the center of curved surface 19 to the centroid of the contacted sensors on curved surface 19, and R is the radius of the curvature of curved surface 19.

The tilt angles defined by the locations of pressure sensors 22 can be predetermined and saved as a lookup table in memory 54. Controller 52 can then access the lookup table to determine the tilt angle from the location of ball 12 and then save the tilt angle in memory 54.

In one embodiment, controller 52 triggers an alarm when the tilt angle is greater than a threshold for a predetermined amount of time. Controller 52 uses I/O block 56 to transmit the alarm to external device 58. Alternatively, external device 58 can trigger an alarm when the tilt angle is greater than a threshold for a predetermined amount of time. External device 58 can either receive the tilt angle from controller 52 or determine the tilt angle from the ball location received from controller 52.

In step 86, controller 52 determines if it has completed monitoring host 16. Controller 52 has completed monitoring host 16 when host 16 reaches its destination or when a predetermined amount of time has lapsed. If so, then step 86 is followed by step 88. If controller 52 has not completed monitoring host 16, then step 86 is followed by step 82 and the above steps repeat.

In step 88, controller 52 optionally uses I/O block 56 to transmit the entire time-series data saved in memory 54 to external device 58.

Figure 6:
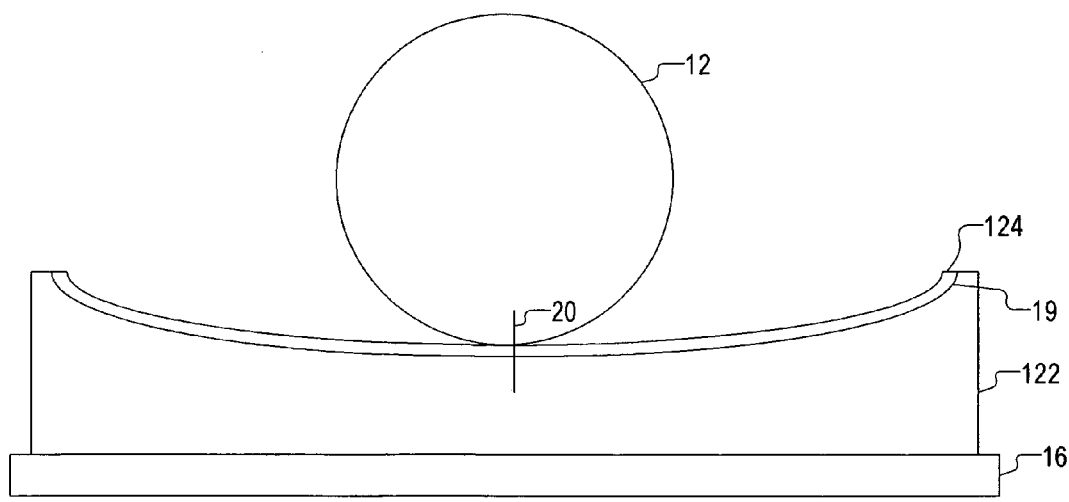
FIGS. 6 and 7 are side and top views of a mass and a sensor pad with a touch screen for determining the motion of a host in another embodiment of the invention.
Figure 7:
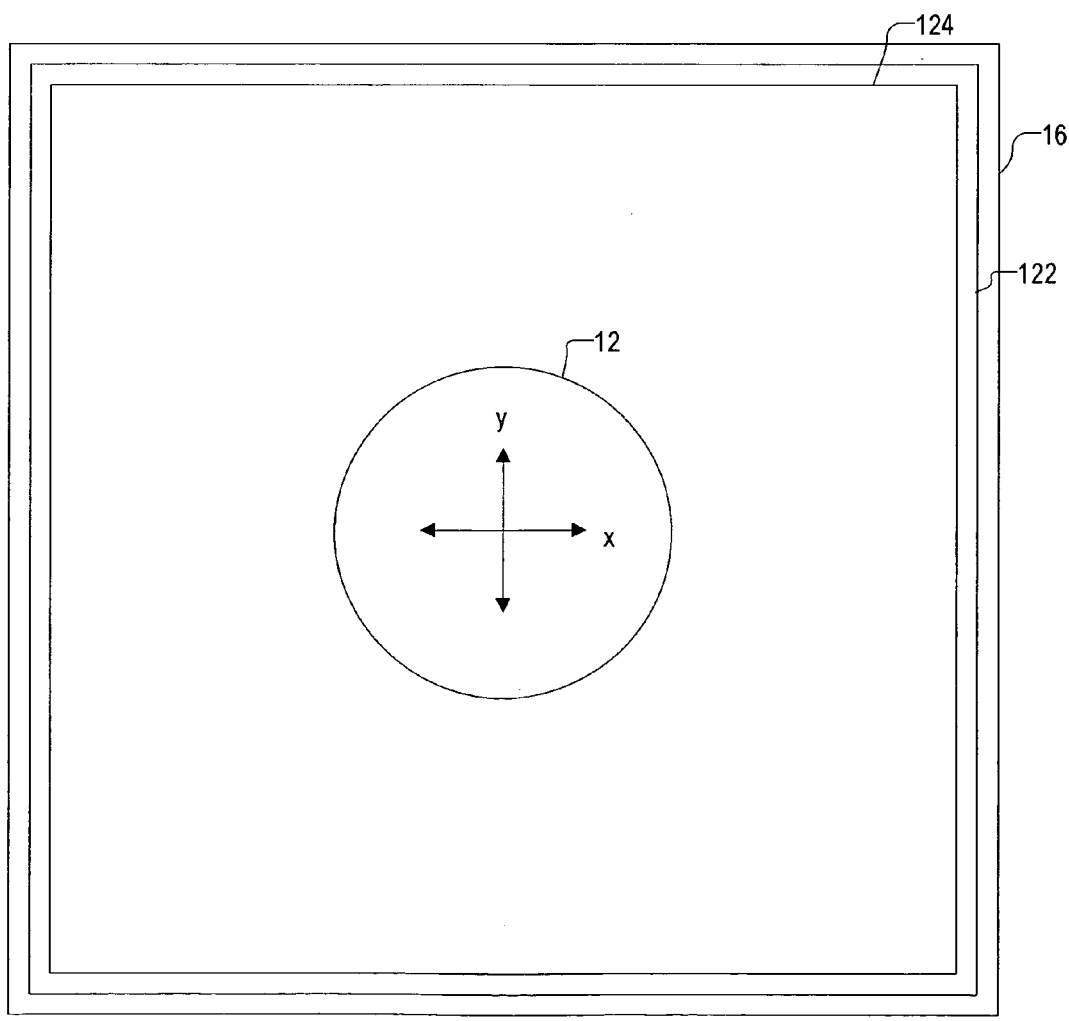

FIGS. 6 and 7 are side and top views of ball 12 and a sensor pad 122 for determining the motion of host 16 in one embodiment of the invention. Like sensor film 18, sensor film 124 conforms to a surface 19 that has a positive slope away from the center 20 of the sensor pad 122 so that ball 12 rests at the center 20 of the sensor pad 122 when host 16 is level. However, instead of using pressure sensors 22, sensor film 124 is a conventional touch screen placed over sensor pad 122 to determine the location of ball 12. Conventional touch screen can use capacitive, resistive, infrared, or surface wave technology to determine the location of ball 12. Sensor pad 122 can replace sensor pad 14 in system 50 (FIG. 3) and be used with system 50 in method 80 (FIG. 4).

Various other adaptations and combinations of features of the embodiments disclosed are within the scope of the invention. Numerous embodiments are encompassed by the following claims.

What is claimed is:

1. A sensor system mounted on a host for determining a motion of the host in route to a destination, comprising:
   a sensor pad having a surface with a positive slope away from a center of the surface;
   a mass resting on the sensor pad, wherein the sensor pad determines the location of the mass to determine the motion of the host;
   a memory retaining values of a parameter at least until the host reaches the destination; and
   a controller coupled to the memory and the sensor pad, the controller saving in the memory the values of the parameter over time, wherein the parameter is selected from the group consisting of the location of the mass and the motion of the host based on the location of the mass.

2. The sensor system of claim 1, wherein the mass is a ball.

3. The sensor system of claim 1, wherein the surface has a shape selected from a group consisting of a parabolic shape and a spherical shape.

4. The sensor system of claim 1, further comprising:
   an I/O block for transmitting the values of the parameter to an external device.

5. The sensor system of claim 1, further comprising a global positioning system unit for detecting a position of the host, wherein the controller saves in the memory the values of the position of the host over time.

6. A sensor system mounted on a host for determining a motion of the host, comprising:
   a sensor pad having a surface with a positive slope away from a center of the surface, wherein the sensor pad comprises a film having an array of pressure sensors; and
   a mass resting on the sensor pad, wherein the sensor pad determines the location of the mass for determining the motion of the host.

7. The sensor system of claim 6, wherein the pressure sensors comprises MEMS pressure sensors.

8. The sensor system of claim 6, wherein the mass is a ball and the surface has a shape selected from a group consisting of a parabolic shape and a spherical shape.

9. The sensor system of claim 6, further comprising an I/O block for transmitting the location of the mass to an external device.

10. A sensor system mounted on a host for determining a motion of the host, comprising:
   a sensor pad having a surface with a positive slope away from a center of the surface, wherein the sensor pad comprises a touch screen; and
   a mass resting on the sensor pad, wherein the sensor pad determines the location of the mass to determine the motion of the host.

11. The sensor system of claim 10, wherein the pressure sensors comprises MEMS pressure sensors.

12. The sensor system of claim 10, wherein the mass is a ball and the surface has a shape selected from a group consisting of a parabolic shape and a spherical shape.

13. The sensor system of claim 10, further comprising an I/O block for transmitting the location of the mass to an external device.

14. A method for a sensor system to detect a motion of a host in route to a destination, comprising:
   detecting a location of a mass resting on a surface of a sensor pad, wherein the surface has a positive slope away from a center of the surface;
   saving in a memory over time values of a parameter, the parameter being selected from the group consisting of the location of the mass and the motion of the host based on the location of the mass; and
   retaining in the memory the values of the parameter at least until the host reaches the destination.

15. The method of claim 14, further comprising transmitting the values of the parameter to an external device.

16. The method of claim 14, wherein the motion of the host comprises a tilt angle of the host based on the location of the mass.

17. The method of claim 14, further comprising triggering an alarm if the motion exceeds a threshold.

18. The method of claim 14, further comprising:
   detecting a position of the host; and
   saving in the memory the values of the position of the host over time.

19. A method for a sensor system to detect a motion of a host, comprising:
   detecting a location of a mass resting on a surface of a sensor pad, wherein the surface has a positive slope away from a center of the surface;
   wherein the sensor pad comprises a film having an array of pressure sensors and said determining a location of a mass comprises receiving the location from the array of pressure sensors.

20. The method of claim 19, wherein the pressure sensors comprises MEMS pressure sensors.

21. The method of claim 19, wherein the mass is a ball and the surface has a shape selected from a group consisting of a parabolic shape and a spherical shape.

22. The method of claim 19, further comprising transmitting the location of the mass to an external device.

23. A method for a sensor system to detect a motion of a host, comprising:
   detecting a location of a mass resting on a surface of a sensor pad, wherein the surface has a positive slope away from a center of the surface;
   wherein the sensor pad comprises a touch screen and said determining a location of a mass comprises receiving the location from the touch screen.

24. The method of claim 23, wherein the pressure sensors comprises MEMS pressure sensors.

25. The method of claim 23, wherein the mass is a ball and the surface has a shape selected from a group consisting of a parabolic shape and a spherical shape.

26. The method of claim 23, further comprising transmitting the location of the mass to an external device.

* * * * *